Feb. 1, 1955　　　　E. CAVALIERI　　　　2,701,071
RECEPTACLE EMPTYING DEVICE
Filed July 13, 1949.　　　　　　　　　　5 Sheets-Sheet 1
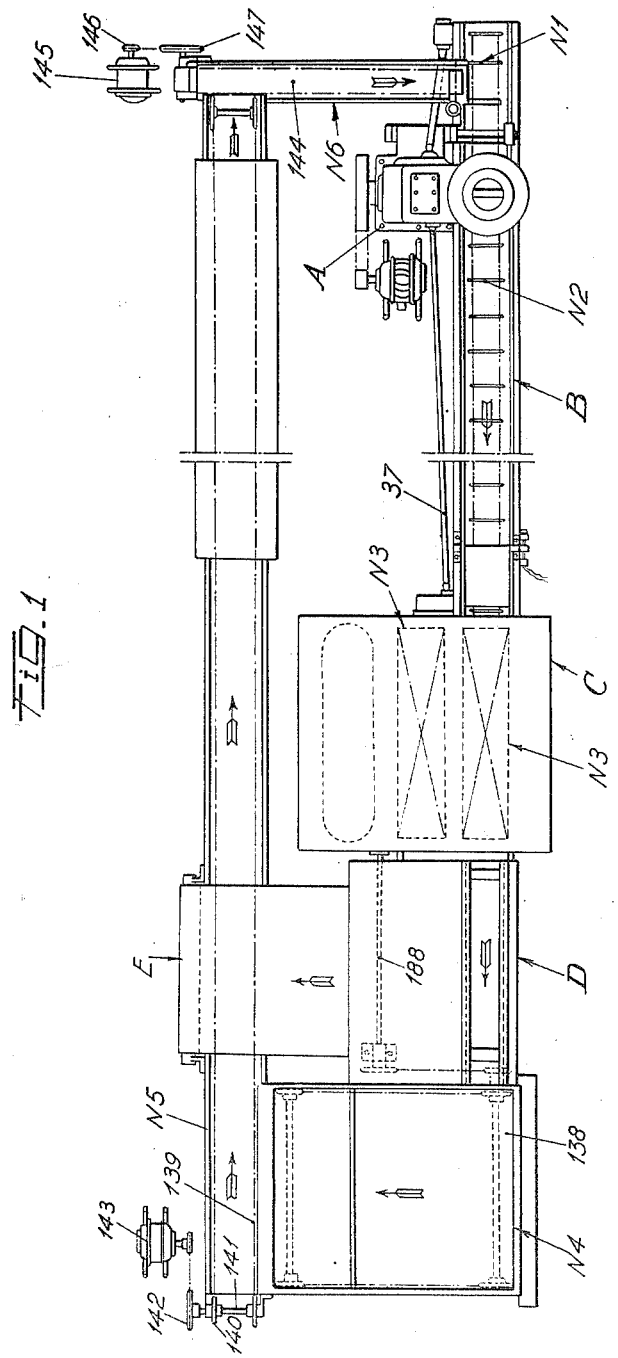
INVENTOR.
EMILIO CAVALIERI
BY
Bertram Ottinger
ATTORNEY

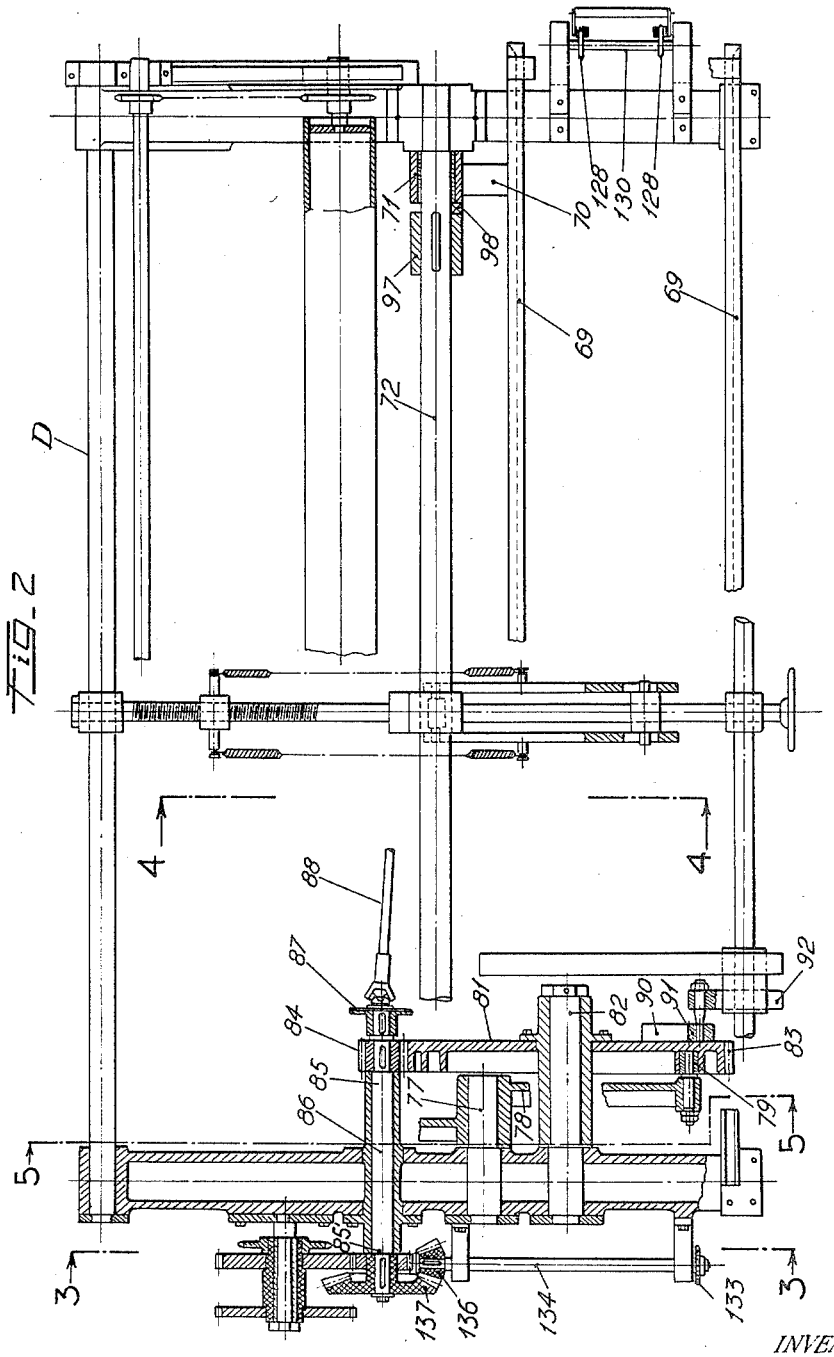

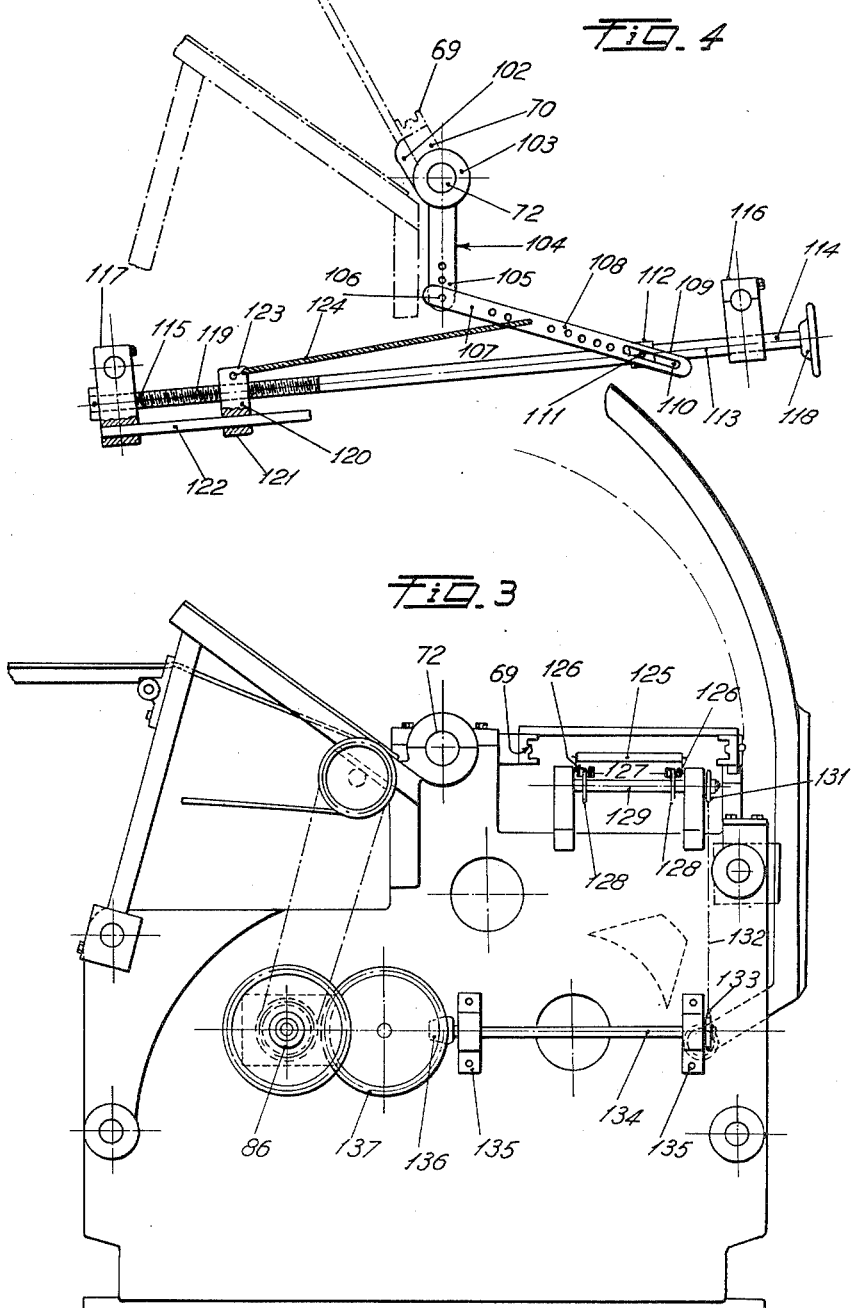

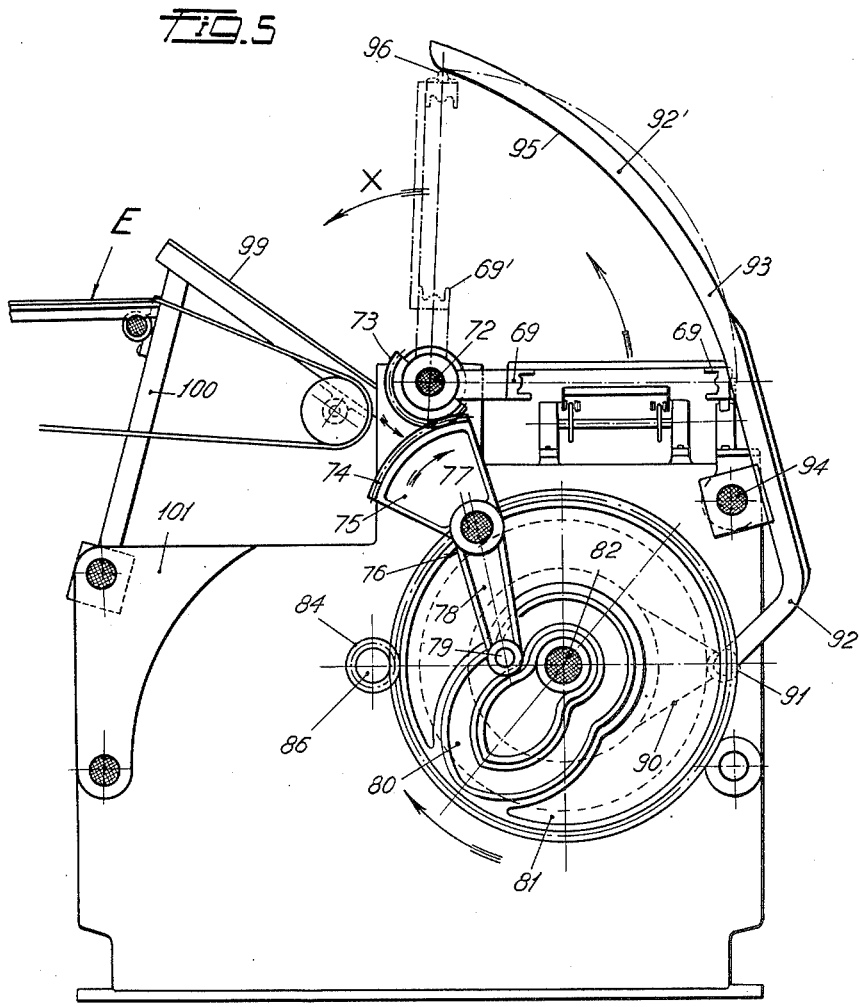

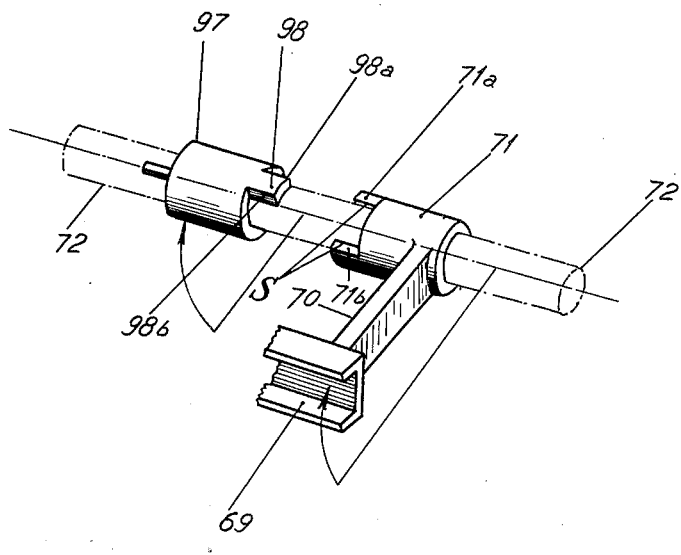
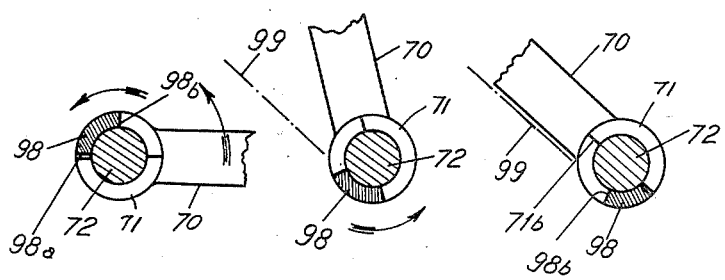

United States Patent Office 2,701,071
Patented Feb. 1, 1955

2,701,071

RECEPTACLE EMPTYING DEVICE

Emilio Cavalieri, Milan, Italy, assignor to S. A. Macchine Industria Dolciaria Carle & Montanari, Milan, Italy Application July 13, 1949, Serial No. 104,564

2 Claims. (Cl. 214—308)

This invention relates to machines for the continuous automatic molding of chocolate and is concerned with the removal of the molded chocolate from the molds preparatory to the feeding of the molded products to wrapping and packaging equipment and the return of the molds for further use.

The principal object of the invention is to provide novel mechanism for removing the molded chocolate from the molds for use in chocolate molding machinery which comprises a filling machine for filling liquid chocolate into molds that are fed to such filling machine by a conveying band, a shaking machine by which the chocolate is compacted in the molds to drive out any air bubbles that might remain entrapped within the chocolate while it is being poured into the molds and provided with an intermittently operated band conveyor, a cooling chamber whereinto the molds that come from the agitating machine are conveyed by a third conveyor band in order to cool the chocolate, and a knocking-out machine by which the chocolate moldings are knocked out from the molds.

Thus according to the present invention the molds after leaving a cooling cabinet are received by displaceable guides which are swung up through an angle of more than 90° and caused to strike an inclined plane so that the chocolate is knocked out of the molds which are held by the guides and returned with them to normal position before the molds are removed therefrom to be returned to the manufacturing cycle.

The invention will hereinafter be described with reference to a preferred embodiment, given only by way of example, with reference to the accompanying drawings in which:

Figure 1 shows a diagrammatic top view of a chocolate molding plant incorporating the new knocking-out machine, Figure 2 is a cut-away part sectional plan of the knocking-out machine on a larger scale, Figure 3 is a cross-section elevation taken on the line 3—3 of Figure 2, Figure 4 shows a device designed to adjust the force of the blow by which the chocolate moldings are ejected from the molds being a view on the line 4—4 of Figure 2, Figure 5 shows a cross-section of the knocking-out machine along the line 5—5 of Figure 2, Fig. 6 is a perspective exploded view of the device for rotatably driving the mold guides, and Figs. 7, 8 and 9 are fragmentary sequence views showing, respectively, the initial engaging position of a tooth which rotates the mold guides, the intermediate position, viz. when the guides, further following their rotation fall by gravity, and the overturned position attained by falling.

The installation consists, as diagrammatically indicated in Figure 1, in a filling machine A by which molds that are automatically conveyed by a suitable intermittently moving belt conveyor $N_1$ are filled up with the liquid chocolate in order to obtain the required chocolate shapes; a shaking machine B, by which the chocolate poured into the molds is compacted so as to drive out any air bubbles that might be trapped in the chocolate while pouring it into the molds and having an intermittently driven conveyor belt $N_2$ whereon are transferred the molds that are coming from the belt conveyor $N_1$ for which purpose both belt conveyors $N_1$ and $N_2$ are arranged co-axially and co-planarly with each other; a cooling cabinet C into which the molds coming from the shaking machine are fed in order to cool the chocolate, whereafter the molds are conveyed to the knocking-out machine D which is hereinafter more fully described and by which the chocolate moldings are knocked out of the molds and caused to fall on a continuously driven collecting band E, by means of which the moldings are forwarded to wrapping and packaging equipment; the latter machine being also provided with a discharging device by which the empty molds are caused to fall upon a band conveyor $N_4$ designed to convey the empty molds discharged from the knocking-out machine to a further band conveyor $N_5$ from which the molds are transferred onto a band conveyor $N_6$ and finally, the molds are transferred therefrom to the first band conveyor $N_1$ of the filling machine A, in order to return them into the manufacturing cycle. Suitable prime movers are fitted to drive the hereinbefore described plant.

After they have been cooled in the cooling cabinet the molds are ejected therefrom in batches and received into the knocking-out machine which will now be described with reference to Figures 2 to 9 of the drawings.

As the molds leave the cooling cabinet they are received between a pair of guides 69 suitably held in parallel spaced relation and carried at each end by arms 70 fast with sleeves 71 which are free on a shaft 72 and form part of lost motion connections by means of which the guides 69 are caused to accomplish a given angular motion on rotation of the shaft 72, whereby the molds are tilted onto a chocolate discharging plane as later described. To this latter purpose, the guides 69 are formed as channels (see Figures 3 and 5) and the molds are fed between the channels to be retained thereby during the whole of the tilting operation.

On the shaft 72 is keyed a toothed sector 73 (see Figure 5) which meshes with a second sector 74 shaped in such a manner as to form one arm 75 of a rocker 76, pivoted on shaft 77, of which the other arm 78 is provided with a roller 79 working in a cam-shaped groove 80 machined on a crank wheel 81 that is loosely fitted on a journal 82; latter wheel 81 also has peripheral teeth which mesh with a pinion 84 (see Figure 2) keyed on one end 85 of a shaft 86.

The projecting end 85 (see Figure 2) of such shaft 86 is connected through a universal joint 87 to a shaft 88 which derives its driving motion through mechanism in the cabinet from the shaft 37 from the filling machine A (Figure 1) so ensuring synchronous operation with other parts of the whole machine.

The wheel 81 which is rotating always in the same direction causes the rocker 76 to swing about its pivot with the result that there is alternating rotation of the shaft 72 which is taken through the lost motion connection, as later described, so that the mold supporting guides 69 are swivelled, i. e. there is an upward movement for the knocking-out of the chocolate from the molds, and a downward movement at the end of which the supporting guides 69 will take again their initial, i. e. horizontal position and are ready to receive a further set of molds.

A cam 90 rigidly secured to the wheel 81 (see Figure 5) is effective on a roller 91 fitted at the end 92 of a member 93 which is pivoted on 94 and has one arc-shaped end 92[1] against the inside surface 95 of which runs a roller 96 fitted on the outside guide member 69, in such a manner as to brake the downward motion of the guides 69 while they are being returned to their initial position.

The shaft 72, which is rotated in alternate directions by the toothed sector 73 for tilting the guides 69, imparts the required motion to such guides by means of the other parts of the lost motion connections comprising sleeves 97 (Figure 6) rigidly keyed on such shaft and each provided with a tooth 98 which meshes in a tooth gap S machined in the respective sleeves 71, whereby these sleeves 71 are also caused to rotate until the guides reach substantially vertical position (see Figure 5) whereupon they fall over freely by their own weight in the direction shown by the arrow X onto the fixed inclined plane 99 fast with an upright 100 with which a shoulder 101 of the machine frame is provided.

More particularly referring to Figs. 6–9 where but one guide 69 and its associated arm 70 are shown since the other is identical, sleeve 71 is in one piece with arm 70. Sleeve 97 is keyed fast to shaft 72.

Shaft 72 (Fig. 5) is alternately rotated through an angle smaller than 180°, in one direction and then in the opposite one, as aforesaid, by means of the mechanism illustrated in Fig. 5, said angle being comprised between the horizontal plane, where guides 69 are in a resting position, and the oblique plane 99.

Guides 69 are initially carried into rotation by the side 98a of tooth 98 that operates on the corresponding surface 71a of the gap S presented by sleeves 71 (Fig. 7).

As shaft 72 and therefore sleeve 97 rotate, tooth 98 carries along sleeve 71, which, as soon as the vertical position is passed (Fig. 8) continues its rotation by the effect of the fall by gravity of guides 69 together with their relative molds carried by them.

The falling position, and therefore the expulsion position of the chocolate tablets, is shown in Fig. 9.

After this phase, shaft 72 is caused to invert its direction of rotation, so that it will then be the turn of side 98b of the tooth 98 to operate upon the corresponding side 71b of opening S presented by sleeves 71 loose on shaft 72, and in this way the same operations as for the upturning of guide 69 toward oblique plane 99 are repeated, that is, gears 73 and 74 for operating shaft 72 still remaining in mesh, after having passed the vertical position during the right hand rotation, guides 69 will fall by their own weight down to a horizontal position.

In order to damp the shock that would be caused by a too sudden contacting of the guides 69 with the plane 99, a damping device is provided (see Figure 4) which consists of a spring loaded articulated system, and in particular in a nose 102 secured to a sleeve 103 which is loosely rotatable on the shaft 72 and which also has an arm 104, the end 105 of which is pivotally connected at 106 to the end 107 of a lever or tie-rod 108, the opposite end 109 of which is slotted at 110 and takes over a pin 111 provided on a collar 112 which is fitted on a rod 113 in such a manner as to slide freely along it. The rod 113 is supported at both ends by the supports 116, 117 respectively and can be rotated by a handwheel 118 fitted on its end 114.

On the end section 115 of the rod 113 is cut a thread 119 along which can be moved a nut 120 which is guided and held against rotation at its end 121 by sliding along a rod 122 while the opposite end 123 of the nut is connected by a spring 124 to the tie-rod 108. Thus the movement of guides 69 is restrained by the spring 124 when the guide carrying member 70 contacts with the nose 102 and is opposed by a resilient resistance, whereby the shock is conveniently damped.

To adjust the rate of falling of guides 69, it is sufficient to actuate the handwheel 118, whereby a change is caused in the pre-loading of spring 124.

After the chocolate has been knocked out of the molds, these latter can be discharged and returned to the first step of the manufacturing cycle, i. e. to be filled up again.

For the latter purpose, a device is provided for withdrawing the molds from the guides 69, which device consists in a cross-member 125 (see Figures 2 and 3) carried by side supports 126 secured to a pair of endless chains 127 running on a corresponding pair of sprocket wheels 128 that are keyed respectively on the driving shaft 129 (Figure 3) and driven shaft 130 (Figure 2).

The shaft 129 is also provided with a sprocket 131 (see Figure 3) engaged by an endless chain 132 driven by a sprocket 133 keyed on a shaft 134 which is carried by supports 135; latter shaft 134 is also provided with a bevel pinion 136 driven by a bevel gear 137 keyed on one end $85^1$ (see Figure 2) of the shaft 86, whereby when the chains 127 are set in motion, the cross member 125 is caused to accomplish a longitudinal stroke, the effect of which—since said cross-member 125 when beginning its stroke is against the end of the first mold— all molds contained in the guides 69 are transferred onto a band conveyor $N_4$ (see Figure 1) and from thence onto a longitudinal band conveyor $N_5$, by which the empty molds are taken along and transferred to band conveyor $N_6$ and to the first step of the manufacturing cycle.

The band conveyor $N_5$ consists in a pair of continuously driven endless chains 139 (see Figure 1) provided with a number of mold supporting rods. Said endless chains are driven by corresponding pairs of sprocket wheels 140, keyed on a shaft 141 provided with a pulley 142 connected with a reduction gear driven by an electric motor 143.

Said molds are fed to endless chains 139 at a rate of feed that depends upon their length and size. Then the molds are transferred onto the further conveyor $N_6$ located at 90° in respect to preceding one.

Latter conveyor $N_6$ consists of an endless band 144 driven by a motor 145 through a pulley drive 146, 147 and the molds, which after the aforesaid change of direction, are now traversed with their longitudinal side forward are transferred therefrom to an intermittently driven band conveyor $N_1$ and thus returned to the first step of the manufacturing cycle.

The operation of the plant can briefly be described as follows:

After the molds have been placed on the band conveyors $N_5$, $N_6$ and the hopper of the filling machine A has been filled with liquid chocolate, the plant is started, whereupon the empty molds are transferred from band conveyor $N_6$ to band conveyor $N_1$, which is arranged co-axially and co-planarly with the intermittently driven band conveyor $N_2$. Said molds are then conveyed by the latter band conveyor under the filling machine, by which they are filled up, after which they are transferred to band conveyor $N_2$ of the shaking machine, wherefrom they are transferred to band conveyor $N_3$ of cooling cabinet C in which the chocolate contained in the molds is cooled, whereafter the molds are forwarded to a knocking-out machine by which the chocolate moldings are knocked out of the molds and the empty molds are discharged onto the band conveyor $N_5$ from which they are transferred to band conveyor $N_6$ wherefrom the molds are returned to the first step of manufacturing cycle.

Having now particularly described and ascertained the nature of my said invention, and in what manner the same is to be performed, I declare that what I claim is:

1. An ejector for cold-set objects in molds, said ejector including a mold support, means carried by said support for slidably engaging the top and bottom of a mold slid onto said support so as to quickly detachably secure a mold to said support, means including a shaft to swing said support from a horizontal mold receiving position up to a higher position and then down with the mold upside down, an abutment member against which the support strikes upon downward movement to shock the mold and thereby eject the objects, a movable conveyor to receive the ejected objects, a sleeve rotatable on said shaft, a projection carried by said sleeve and located in the downward path of the support just in advance of the point the point strikes the abutment member, means to spring load said sleeve toward said position of the projection, said spring loading being in a direction opposite to that of the downward travel of the mold support, and means to vary the degree of spring loading.

2. An ejector for cold-set objects in molds, said ejector including a mold support, means carried by said support for slidably engaging the top and bottom of a mold slid onto said support so as to quickly detachably secure a mold to said support, means including a shaft to swing said support from a horizontal mold receiving position up to a higher position and then down with the mold upside down, an abutment member against which the support strikes upon downward movement to shock the mold and thereby eject the objects, a movable conveyor to receive the ejected objects, and means to damp the ejecting shock, said last-named means including a sleeve rotatable on said shaft, a projection carried by said sleeve and located in the downward path of the support just in advance of the point the support strikes the abutment member, an arm carried by said sleeve, a lever pivoted on said arm, a spindle transverse to said shaft, a collar slidable on said spindle, means to loosely pivot said lever on said collar, means to manually rotate said spindle, said spindle having a thread, a lead nut in mesh with said thread, and a tension spring engaged between said lead nut and said lever.

(References on following page)

References Cited in the file of this patent

UNITED STATES PATENTS

| | | |
|---|---|---|
| 1,195,245 | Lowes et al. | Aug. 22, 1916 |
| 1,200,705 | Boyd | Oct. 10, 1916 |
| 1,655,801 | Strauss | Jan. 10, 1928 |
| 1,839,731 | Baum | Jan. 5, 1932 |
| 1,869,232 | Weiland | July 26, 1932 |
| 1,883,482 | Bausman et al. | Oct. 18, 1932 |
| 1,936,584 | Cobb | Nov. 28, 1933 |
| 2,344,664 | Adams | Mar. 21, 1944 |
| 2,409,121 | Fritschle | Oct. 8, 1946 |
| 2,577,091 | Porter | Dec. 4, 1951 |

FOREIGN PATENTS

| | | |
|---|---|---|
| 3,682 | Great Britain | Feb. 14, 1907 |
| 117,153 | Switzerland | Jan. 3, 1927 |